United States Patent
Gulbay et al.

(10) Patent No.: US 11,349,823 B2
(45) Date of Patent: May 31, 2022

(54) SYSTEM AND METHOD FOR PC AS A SERVICE AUTHENTICATION AND SUBSCRIPTION VIA LOW POWER WIDE AREA NETWORK COMMUNICATIONS

(71) Applicant: Dell Products, LP, Round Rock, TX (US)

(72) Inventors: Sinem Gulbay, Austin, TX (US); Jayant Chande, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 598 days.

(21) Appl. No.: 16/146,629

(22) Filed: Sep. 28, 2018

(65) Prior Publication Data
US 2020/0106755 A1     Apr. 2, 2020

(51) Int. Cl.
| | |
|---|---|
| *H04L 29/06* | (2006.01) |
| *H04L 9/40* | (2022.01) |
| *H04N 21/475* | (2011.01) |
| *H04W 8/18* | (2009.01) |
| *H04W 12/06* | (2021.01) |

(52) U.S. Cl.
CPC ............ *H04L 63/08* (2013.01); *H04L 63/107* (2013.01); *H04N 21/4753* (2013.01); *H04W 8/18* (2013.01); *H04W 12/06* (2013.01)

(58) Field of Classification Search
CPC ........ H04L 63/08; H04L 63/107; H04W 8/18; H04W 12/06; H04N 21/4753
See application file for complete search history.

(56) References Cited

U.S. PATENT DOCUMENTS

| | | | |
|---|---|---|---|
| 6,438,750 B1 * | 8/2002 | Anderson ............. | G06F 9/4406 713/1 |
| 2002/1116485 | 8/2002 | Black | |

(Continued)

OTHER PUBLICATIONS

Dali Ismail et al., Low-Power Wide-Area Networks: Opportunities, Challenges, and Directions, Jan. 2018, ACM, pp. 1-6. (Year: 2018).*

(Continued)

*Primary Examiner* — Kari L Schmidt
*Assistant Examiner* — Fahimeh Mohammadi
(74) *Attorney, Agent, or Firm* — Prol Intellectual Property Law, PLLC; H. Kenneth Prol

(57) ABSTRACT

A method of managing access to on-demand cloud services may comprise receiving at a PCaaS cloud management service information handling system log-in credentials from a remote information handling system via a low-power wide area network communication link, executing code instructions to determine if the log-in credentials are associated with an existing subscriber, if the log-in credentials are associated with an existing subscriber whose subscription is not expired, transmitting via the wireless adapter a verification of the log-in credentials to the remote information handling system, establishing via the wireless adapter a high-speed wireless communication link with the remote information handling system, and transmitting code instructions via the wireless adapter of one or more in-band applications associated with the existing subscriber via the high-speed wireless communication link.

20 Claims, 5 Drawing Sheets

(56) References Cited

U.S. PATENT DOCUMENTS

| | | | | |
|---|---|---|---|---|
| 2006/0248593 | A1* | 11/2006 | Dennis | H04L 63/104 705/3 |
| 2010/0107238 | A1* | 4/2010 | Stedman | G06F 21/74 726/13 |
| 2013/0124863 | A1* | 5/2013 | Drucker | H04L 9/3226 713/168 |
| 2014/0298418 | A9* | 10/2014 | Cronk | H04N 21/4753 726/28 |
| 2016/0036628 | A1* | 2/2016 | Gupta | H04W 4/70 455/420 |
| 2016/0294828 | A1* | 10/2016 | Zakaria | H04W 12/06 |
| 2016/0374134 | A1* | 12/2016 | Kweon | H04W 8/205 |
| 2017/0177798 | A1* | 6/2017 | Samuel | H04L 67/12 |
| 2017/0270301 | A1* | 9/2017 | Vidyadhara | G06F 9/4411 |
| 2017/0311304 | A1* | 10/2017 | Lu | H04W 4/70 |
| 2018/0060159 | A1* | 3/2018 | Justin | G06F 11/079 |
| 2018/0373304 | A1* | 12/2018 | Davis | H01H 9/56 |
| 2019/0138716 | A1* | 5/2019 | Huang | H04L 41/0686 |
| 2020/0089518 | A1* | 3/2020 | Beyer | G06F 8/60 |
| 2020/0092294 | A1* | 3/2020 | Sharma | H04L 63/108 |
| 2021/0326147 | A1* | 10/2021 | Shelton | G07F 17/12 |

OTHER PUBLICATIONS

Alexandru Lavric et al., Internet of Things and LoRaTM Low-Power WideArea Networks, Sep. 14, 2017, IEEE, pp. 1-5. (Year: 2017).*

Dhaval Patel et al., Experimental Study on Low Power Wide Area Networks (LPWAN) for Mobile Internet of Things, Nov. 16, 2017, IEEE, pp. 1-5. (Year: 2017).*

Keith E. Nolan et al., An Evaluation Of Low Power Wide Area Network Technologies For The Internet Of Things, Sep. 29, 2016, IEEE, pp. 439-444. (Year: 2016).*

* cited by examiner

SYSTEM AND METHOD FOR PC AS A SERVICE AUTHENTICATION AND SUBSCRIPTION VIA LOW POWER WIDE AREA NETWORK COMMUNICATIONS

FIELD OF THE DISCLOSURE

The present disclosure generally relates to a method and apparatus for PC as a service management of authentication and subscription for on-demand services via always-on communications through a low power wide area network (LPWAN) radio system and front end used with information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. For wireless communications, one or more wireless interface adapters may be used including antenna systems, a front end antenna module and other radio frequency subsystems. Always-on operation may provide for an information handling system to enter one or more sleep states but still be in communications, via an LPWAN radio system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
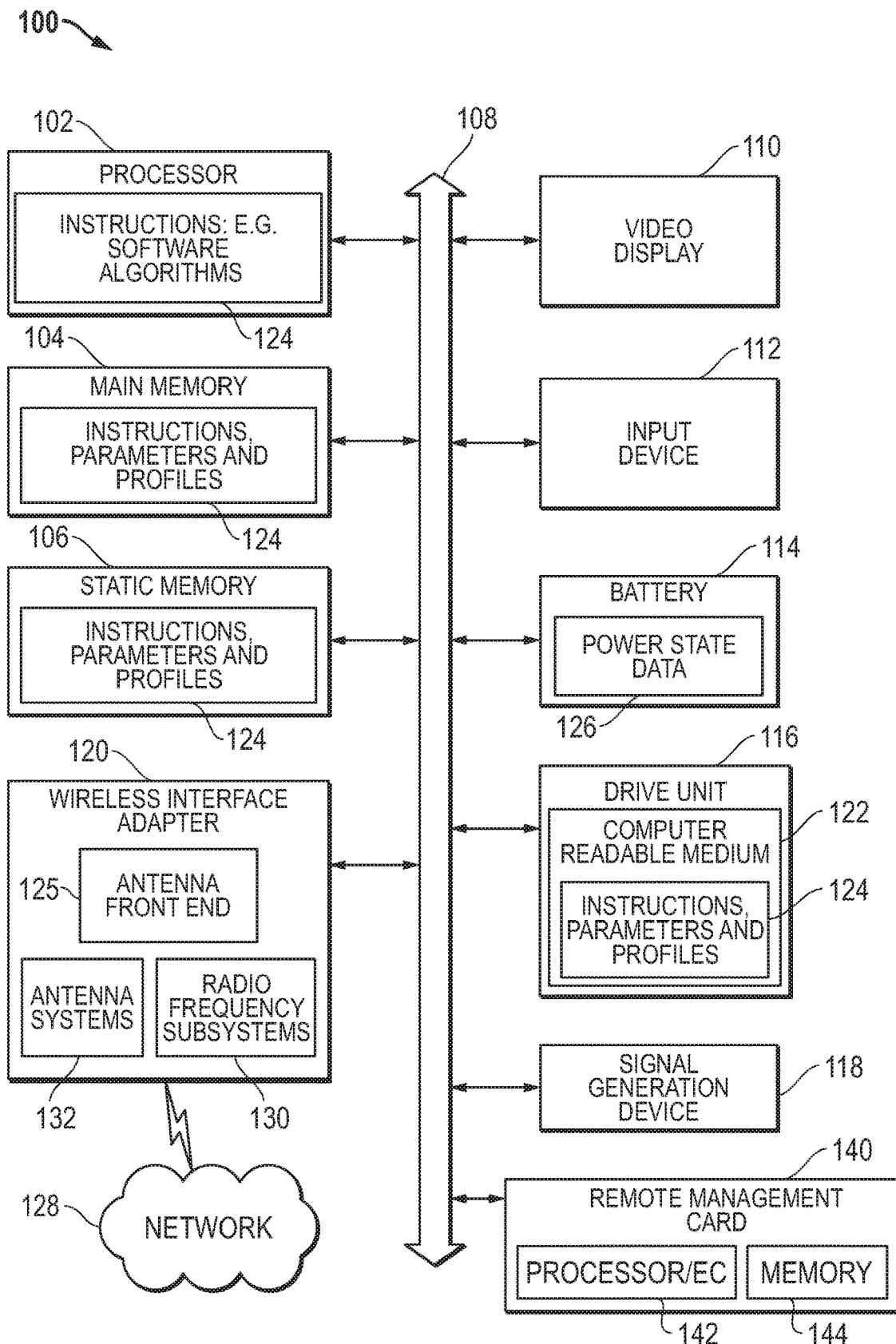
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system may be of a variety of models and types. For example, a personal computer may be a laptop, a 360 convertible computing device, a tablet, smart phone, wearable computing device, or other mobile information handling system and may have several configurations and orientation modes. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components.

In an aspect, the information handling system may have a plurality of antenna systems for communication via wireless links operating on a variety of radio access technologies (RAT). In one aspect, a low power, always-on wireless link connectivity may be established even during powered-down sleep states of an information handling system, such as with low-power wireless local area network (LPWAN) technologies to provide some level of connectivity. In another aspect, several antenna systems may be available for each RAT to enable aggregated data communications such as via plural multiple in, multiple out (MIMO) streams to enhance bandwidth or reliability. Antenna systems may be operated via one or more wireless adapters that may include controllers, memory and other subsystems some of which may operate as a radio frequency (RF) front end for one or more antenna system to transmit wirelessly. In some aspects, the central processor and main operating systems may not need to be operating for wireless communications. Portions of an information handling system may themselves be considered information handling systems.

As mobile computing infrastructure evolves worldwide to enable mobile information handling systems to transmit and receive larger amounts of data more quickly and easily while on the move, tasks previously completed only on stationary information handling systems are now being completed on mobile devices. This may include extended computing at everyday items including Internet of Things (IoT) systems that may monitor, provide services or information, or operate to control other systems at extended locations through places of work, residence, public spaces, or elsewhere. With many of these systems, there are competing needs to keep mobile devices lightweight and to decrease battery consumption. One solution to these contrasting needs is to make some computing services previously confined to a single information handling system (stationary or mobile) available on a plurality of computing resources located near where users or client information handling systems may operate. In such a way, workload may be more evenly distributed across a number of devices such that the power consumption of any one given device is lower than it would be if it were executing the entire workload by itself. These services may be available, on command, via a plurality of mobile edge computing systems connected to the cloud and a plurality of gateway devices for local connectivity to the client information handling systems, including IoT devices, thin client systems, mobile information handlings systems, or the like.

In one such embodiment, called a nomadic computing services system, each subscriber to the nomadic compute system or member of an enterprise providing nomadic compute resources may have access to enhanced computing capabilities through any client information handling system. Such enhanced computing capabilities may include, for example, remote access to an existing user profile including all stored data and applications associated therewith, as well as high-speed connectivity to remotely-located positions of certain applications. The client information handling system may be a mobile information handling system or thin client device that the subscriber may use to access one or more mobile edge computing systems via a wireless gateway or other connection. In an example embodiment, the nomadic computing services system may be subscriber based and digital payment may be made for compute resources provided.

In order to ensure only authorized users access user profiles via the nomadic computing services, a personal computer as a service (PCaaS) cloud management system may perform a subscription verification method according to embodiments herein. A PCaaS in such embodiments may operate via an authentication server or edge node, which may act as a broker for available edge compute resources near a location. In other aspects, some or all of a PCaas cloud management system may operate on a client information handling system seeking edge compute services. In such a way, a reliable and effective PCaaS system may be provided for client information handling systems, IoT devices, thin clients, or may even be accessible by a user having no computing system but only some type of authenticating capability such as biometric access via a local portal or a smartcard detectable at a location.

Embodiments allowing for such remote management via an LPWAN may save time and acquire subscription updates without delay after boot up. Such an approach may also avoid a need to return "leased" information handling systems to the leasing entity or IT management professionals to be reconfigured for the next user.

The PCaaS cloud management system in embodiments herein may operate even when the information handling system upon which it operates is in a semi-dormant or sleep state in order to ensure constant connectivity. Operating at full capacity in such an always-on configuration may be associated with increased battery consumption. In order to keep mobile devices operating some or all of the PCaaS cloud management system lightweight, and decrease battery consumption, the subscription verification method in embodiments of the present disclosure may be performed using out-of-band code instructions transmitted over a low-power wide area network (LPWAN). Such an LPWAN always-on PCaaS cloud management system and solutions provide for constant access of a subscriber's information handling system with in-band applications, while simultaneously limiting battery consumption.

FIG. 1 shows an information handling system 100 capable of administering each of the specific embodiments of the present disclosure. The information handling system 100 can represent the mobile information handling systems 210, 220, and 230 or servers or systems located anywhere within network 200 of FIG. 2, including the remote data centers operating virtual machine applications. Information handling system 100 may represent a mobile information handling system associated with a user or recipient of intended wireless communication. A mobile information handling system may execute instructions via a processor for a low power communications engine in an out-of-band system environment including verifying received login credentials of a subscriber to a remote PCaaS cloud management service. The application programs communicating or otherwise operating via concurrently wireless links may operate in some example embodiments as software, in whole or in part, on a mobile information handling system while other portions of the software applications may operate on remote server systems. The low power communications engine of the presently disclosed embodiments may operate as firmware, software, or hardwired circuitry or any combination on controllers or processors within the information handing system 100 or some of its components. For example, the low power communications engine of embodiments herein may operate via processor or control logic and memory on a remote management card 140 having a processor or embedded controller (EC) 142 and memory 144, on a wireless interface adapter 120 including an embedded controller or processor logic, or on some combination thereof. Some or all of the remote management card 140 or a wireless interface adapter 120 or any portion of either may be integrated with a motherboard or may be separate boards within information handling system 100. The always-on PCaaS authentication and subscription service may operate on the remote management card 140 in some embodiments. In another aspect of an embodiment, the low power communication engine may execute instructions of the PCaaS authentication and subscription service or receive messages from a cloud-based portion of the PCaaS management system.

Information handling system 100 may also represent a networked server or other system and administer aspects of the cloud agents of always-on PCaaS cloud management services via instructions executed on a processor according to various embodiments herein involving remote operation of such systems. Such cloud agents or remotely located always-on PCaaS cloud management services may transmit messages and data via the low-power, always-on radiofrequency signals from base station transmitters via LPWAN.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Display 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input device 112, such as a keyboard, and a cursor control device, such as a mouse or touchpad or similar peripheral input device. The information handling system may include a global position system (GPS) unit or circuit 114. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a 360 degree convertible device, a wearable computing device, or a mobile smart phone.

The information handling system 100 can include a set of instructions 124 that can be executed to cause the computer system to perform any one or more of the methods or computer based functions disclosed herein. For example, instructions 124 may include operating systems or in-band software applications which utilize one or more wireless links for wireless communications via the wireless interface adapter or receive and transmit messaging via low power wireless connections. Such instructions 124 may operate other aspects or components of an information handling system. Similarly, instructions 124 may be executed as part of in-band or out-of-band operations responsive to low power communications for always-on PCaaS cloud management services that may verify login credentials of a PCaaS cloud management services subscriber currently accessing the information handling system 100. The low power communications engine operating within an out-of-band environment in some embodiments may utilize processing resources of a remote management card 140 or of a low power wireless interface adapter 120. The low power communications engine may operate as firmware on a controller or software on a processor within the remote management card 140, the wireless interface adapter device 120, or some combination and utilize low power wireless connectivity for communications. The low power communications engine receives low power wireless data communications from network 128, such as through various LPWAN protocols, via the low power antenna system 132 and antenna front end 125 as described in the present disclosure.

Wireless interface device 120 may include an embedded processor, controller, or access to other processing not requiring the entire CPU 102 and information handling system to wake up to a high-power, high operation state in some embodiments of an LPWAN connected system. The wireless interface device 120 may include radiofrequency subsystems 130 including controllers, a processor, or other logic to implement operation of a low power communications engine according to some embodiments herein. In other embodiments, controllers, a processor, or other logic may be accessed for operation in an out-of-band operation environment for operations of the low power communications engine such as on remote management card 140 having processor or embedded controller 142. Further, the wireless interface device 120 or remote management card 140 may have or may access a memory for storing received low power messages not deemed for elevation to internal applications until an information handling system 100 otherwise wakes up according to some embodiments. Such a system may provide for out-of-band operation for background or limited operation to enable the information handling system 100 to be always-connected, such as via a LPWAN wireless protocol and to conduct some communications and processing while in a sleep state or under low power state conditions.

Various software modules comprising software application instructions 124 or firmware instructions may be coordinated by an operating system (OS) and via an application programming interface (API). An example operating system may include Windows®, Android®, and other OS types known in the art. Example APIs may include WinAPIs (e.g. Win32, Win32s, Win64, and WinCE), Core Java API, or Android APIs. In a further example, processor 102 may conduct monitoring and processing of information handling system usage trends, provisioning, updates, security applications according to the systems and methods disclosed herein. The computer system 100 may operate as a standalone device or may be connected such as using a network, to other computer systems or peripheral devices. For example, a cloud client information handling system may provide for always-on management or security solutions to managed information handling systems in low-power states as well as when the managed information handling systems are fully awake and operating via an active processor 102 and the main operating system.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein.

In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the low power communications engine or the PCaaS subscription based system may be executed locally or remotely. The main memory 104 and the processor 102 also may include computer-readable media.

A network interface device shown as wireless adapter 120 can also provide connectivity to a network 128 not only for LPWAN as described, but also via other wireless protocols that may be deployed with the information handling system. For example, a wide area network (WAN), a local area network (LAN), wireless local area network (WLAN), a wireless personal area network (WPAN), a wireless wide area network (WWAN), or other network may be implemented with a wireless adapter such as 120. Connectivity may be via wired or wireless connection. Wireless adapter 120 may include one or more radio frequency subsystems 130 with transmitter/receiver circuitry, modem circuitry, one or more unified radio frequency front end circuits, one or more wireless controller circuits, amplifiers, antenna systems 132 and other radio frequency subsystem circuitry 130 for wireless communications via multiple radio access technologies. Each radiofrequency subsystem 130 may communicate with one or more wireless technology protocols. The radiofrequency subsystem 130 may contain individual subscriber identity module (SIM) profiles for each technology service provider and their available protocols for subscriber based radio access technologies such as cellular LTE communications. The wireless adapter 120 may also include antenna systems 132 which may be tunable antenna systems for use with the system and methods disclosed herein.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Other shared communication frequency bands are contemplated for use with the embodiments of the present disclosure as well.

The wireless adapter 120 may operate in accordance with any wireless data communication standards. To communicate in LPWAN, standards including Narrow Band IoT and LTE Category Machine (e.g., Cat M1) standards promulgated by 3GPP Narrowband cellular or later iterations may be utilized. For example, Narrow Band IoT may operate at 200 kHz and LTE Cat M1 band may operate in a range from 1.4 to 20 MHz. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with LPWAN standards, the WLAN standards, and WWAN carriers which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for LPWAN, 5G small cell WWAN, Wi-Fi WLAN or WiGig connectivity and one or more additional antenna system transmitters 132 for other wireless communication types. The radio frequency subsystems 130 include wireless controllers to manage authentication, connectivity, communications, power levels for transmission, buffering, error correction, baseband processing, and other functions of the wireless adapter 120.

The wireless network 128 may have a wireless mesh architecture in accordance with mesh networks described by the wireless data communications standards or similar standards in some embodiments but not necessarily in all embodiments. The wireless adapter 120 may also connect to the external network 128 via an LPWAN, WPAN, WLAN, WWAN or similar wireless switched connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. Moreover, BIOS/FW code may manage and respond to wake up commands from various advanced configuration and power interface (ACPI) states via ACPI-aware BIOS and controls via ACPI tables, BIOS, and registers. Such ACPI operation may control global states, processor states, device states for various types of sleep states as well as performance states such as CPU or GPU throttling and the like. This may include Active State Power Management (ASPM) as well as other power management measures in the information handling system 100. In a particular embodiment, BIOS/FW code may reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 106, in a storage system (not illustrated) associated with network channel of a wireless adapter 120, in another storage medium of information handling system 100, or a combination thereof. Application programs and BIOS/FW code such as code instructions 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as solid state memory, disks, tapes, or other storage device to store information received via carrier wave signals such as a signal communicated over a transmission medium. Furthermore, a computer readable medium can store information received from distributed network resources such as from a cloud-based environment. For example, a digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
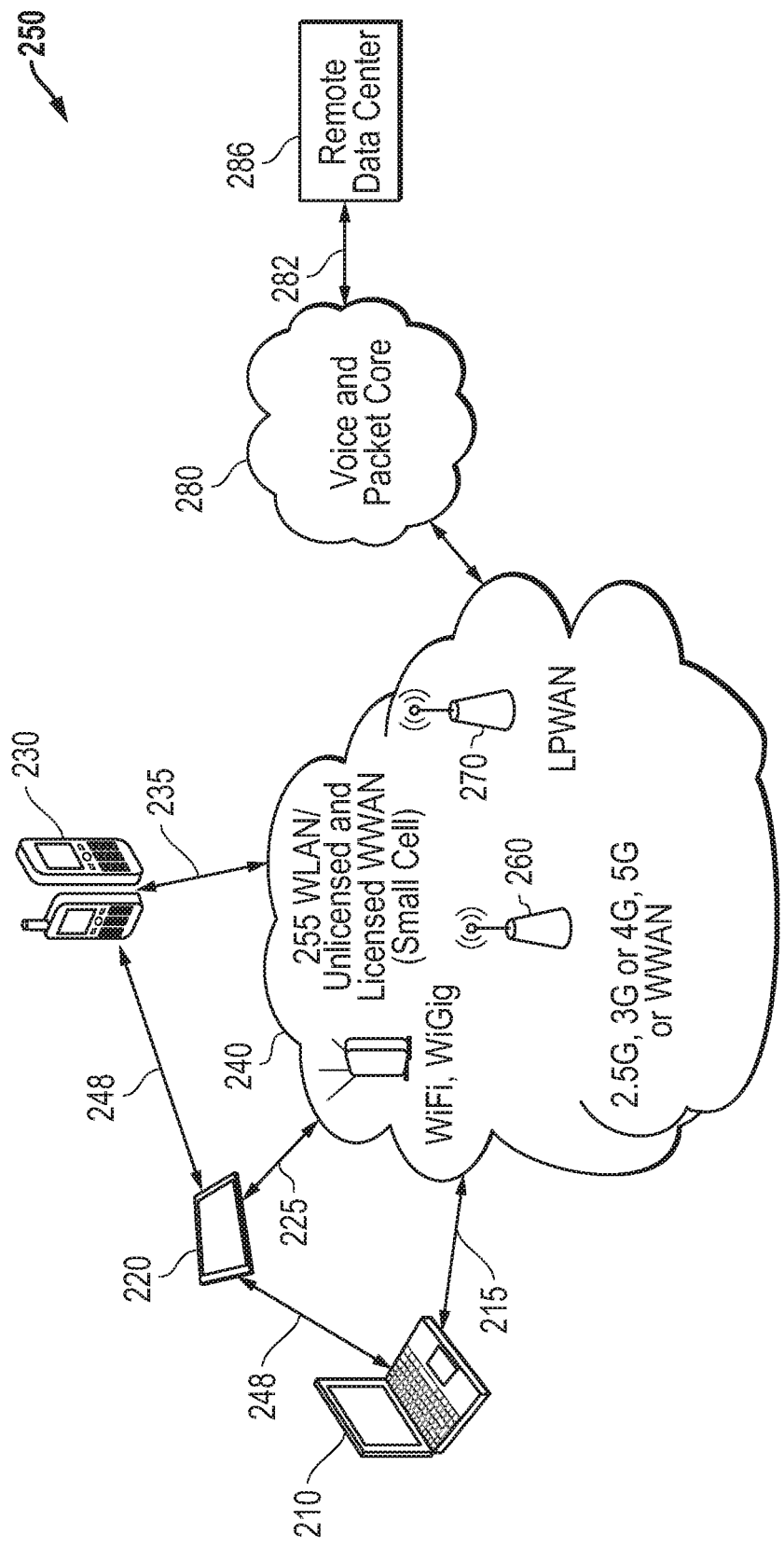
FIG. 2 is a block diagram of a network environment offering several communication protocol options and mobile information handling systems according to an embodiment of the present disclosure.

FIG. 2 illustrates a network 200 that can include one or more information handling systems. In a particular embodiment, network 200 includes networked information handling systems 210, 220, and 230 with wireless capabilities, wireless network access points, and multiple wireless connection link options. A variety of additional computing resources of network 200 may include client mobile information handling systems, data processing servers, network storage devices, local and wide area networks, or other resources as needed or desired. As specifically depicted, systems 210, 220, and 230 may be a laptop computer, tablet computer, 360 degree convertible systems, wearable computing devices, a smart phone device, server systems, or other computing systems. These mobile information handling systems 210, 220, and 230, may access any of a plurality of wireless networks 240. Wireless networks 240 may include low-power wide area networks (LPWAN) 270, a macro-cellular network 260, or wireless local networks such as 255. For example, the wireless networks 240 may be the LPWAN network 270 described in embodiments herein for low-power, always-on wireless communication in some embodiments. In other embodiments, wireless networks may include wireless local area networks (WLANs) 255, a wireless personal area network (WPAN) 248 as between devices such as 210, 220, and 230, or a wireless wide area network (WWAN) such as 260. In an example embodiment, LTE LPWAN networks may operate with a wireless access point option such as an eNodeB (eNB) base station or other LPWAN base station device. In another example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN or an LPWAN may be connected by wireline or Ethernet connections to a wider external network. For example, wireless network access points may be connected to a wireless network controller and an Ethernet switch.

Wireless communications across any of wireless networks 240 may be via standard protocols such as Narrow-band IoT LPWAN, LTE Category Machine LPWAN standards (such as Cat M1), IEEE 802.11 Wi-Fi, IEEE 802.11ad WiGig, IEEE 802.15 WPAN, IEEE 802.16 Wi-MAX, Telecommunications Union International Mobile Telecommunications (ITU-IMT) 5G wireless wide area network (WWAN) standard 2020, long term evolution unlicensed spectrum (LTE-U) standard, or other emerging 5G small cell WWAN communications such as eNodeB, or similar wireless network protocols. Alternatively, other available wireless links within wireless networks 240 of network 200 may include macro-cellular connections via one or more service providers 260. Service provider macro-cellular connections may include 2G standards such as GSM, 2.5G standards such as GSM EDGE and GPRS, 3G standards such as W-CDMA/UMTS and CDMA 2000, 4G standards including LTE-U, or emerging 5G standards including WiMAX, LTE, and LTE Advanced, LTE-LAA, small cell WWAN, and the like. Wireless networks 240 may include a variety of licensed, unlicensed or shared communication frequency bands as well as a variety of wireless protocol technologies ranging from those operating in macrocells, small cells, picocells, or femtocells.

In some embodiments according to the present disclosure, a networked information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example protocols for use with LPWAN may be low-power wireless network access protocols such as Long Range (LoRa) chirp spread spectrum radio modulation technology, Ultra Narrow Band (UNB) modulation technology, LTE Narrowband IoT (NB-IOT) and LTE Category Machine Type Communications (LTE-MTC) protocol types, DASH7 Mode 2 development framework for low power wireless networks, random phase multiple access (RPMA), and direct sequence spread spectrum (DSSS) enabling device to device communications along with connectivity to wider network resources via ethernet or other wired connections. With LPWAN wireless links, information handling systems such as 210, 220, and 230 may remain connected for always-on communication to support methods for the verification of on-demand service subscriptions while the information handling systems 210, 220, and 230 are in a sleep state that may currently be implemented.

Wireless networks 240 may be connected through to a PCaaS cloud management service 280 that may manage user authentication and user subscriptions to a plurality of on-demand service subscriptions. The on-demand service subscriptions may provide access for in-band applications on a remote information handling system to access software and other services. The PCaaS cloud management service 280 may contain externally accessible computing resources and connect to a remote data center 286 in network 250. The PCaaS cloud management service 280 may contain multiple intermediate web servers or other locations with accessible data (not shown). The PCaaS cloud management service 280 may also connect to other wireless networks similar to 240 or 250 and additional mobile information handling systems such as 210, 220, 230 or similar connected to those additional wireless networks. Connection 282 between the wireless networks 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 220, and 230. Alternatively, information handling systems 210, 220, and 230 may connect to the external network via base stations according to various wireless protocols 255, 260, or 270.

In an embodiment, the PCaaS cloud management service 280 may receive log-in credentials associated with an on-demand service subscriber from one of the information handling systems 210, 220, or 230 via the networks 240. In one example embodiment, such log-in credentials may be transmitted from the information handling system 210, 220, or 230 to the PCaaS cloud management service 280 via a LPWAN communication link. The PCaaS cloud management service 280 may check the received log-in credentials against records stored at the remote data center 286 associated with authorized and current subscribers. Portions of the credential log-in process may also occur at the information handling system 210, 220, or 230 in some embodiments. For example, subscription information relating to one or more subscribers may be stored locally on the information handling system 210, 220, or 230 in an encrypted memory element, and user input log-in credentials may also be checked against such stored subscription information.

If the log-in credentials match those for a currently authorized subscriber, the PCaaS cloud management service 280 may establish a high-speed wireless communication link between the information handling system 210, 220, or 230 and the remote data center 286 to enable transmissions of code instructions and data elements between in-band applications residing at the remote data center 286 and the information handling system 210, 220, or 230. Such high-speed wireless communication links in an embodiment may adhere to the IEEE 802.11ad WiGig standard in an embodiment. In another embodiment, the high-speed wireless link may conform to the IEEE 802.16 Wi-MAX standard. The high-speed wireless link in another example embodiment may conform to the ITU-IMT 5G WWAN standard 2020. In yet another embodiment, the high-speed wireless communication link may conform to the LTE-U standard.

Remote data center 286 may include web servers or resources within a cloud environment that operate via the PCaaS cloud management service 280 or other internet connectivity. For example, remote data center 286 can include additional information handling systems, data processing servers, network storage devices, local and wide area networks, or other resources as needed or desired. In an example embodiment, the cloud or remote data center 286 or networked server may run hosted applications for systems 210, 220, and 230 such as in-band applications. Hosting such in-band applications at the remote data center 286 in an embodiment permits fewer resources to be maintained in other parts of network 200.

The cloud or remote data center 286 or networked server may run hosted applications for systems 210, 220, and 230 by establishing a virtual machine application executing software to manage applications hosted at the remote data center 286 in an example embodiment. Information handling systems 210, 220, and 230 may be adapted to run one or more applications locally, and to have hosted applications run in association with the local applications at remote data center 286 or networked servers. For example, mobile information handling systems 210, 220, and 230 may operate some or all in-band software applications utilizing the wireless links, including a concurrent wireless links, of any of the wireless links 240 in some embodiments. Virtual machine applications may serve one or more applications to each of information handling system 210, 220, and 230. Thus, as illustrated, systems 210, 220, and 230 may be running applications locally while requesting data objects related to those applications from the remote data center 286 via wireless network 240 when the information handling systems are awake and operating in various operating states. For example, an electronic mail client application may run locally at system 210. The electronic mail client application may be associated with a host application that represents an electronic mail server. In another example, a data storage client application such as Microsoft Sharepoint may run on system 220. It may be associated with a host application running at a remote data center 286 that represents a Sharepoint data storage server. In a further example, a web browser application may be operating at system 230. The web browser application may request web data from a host application that represents a hosted website and associated applications running at a remote data center 286.

Figure 3:
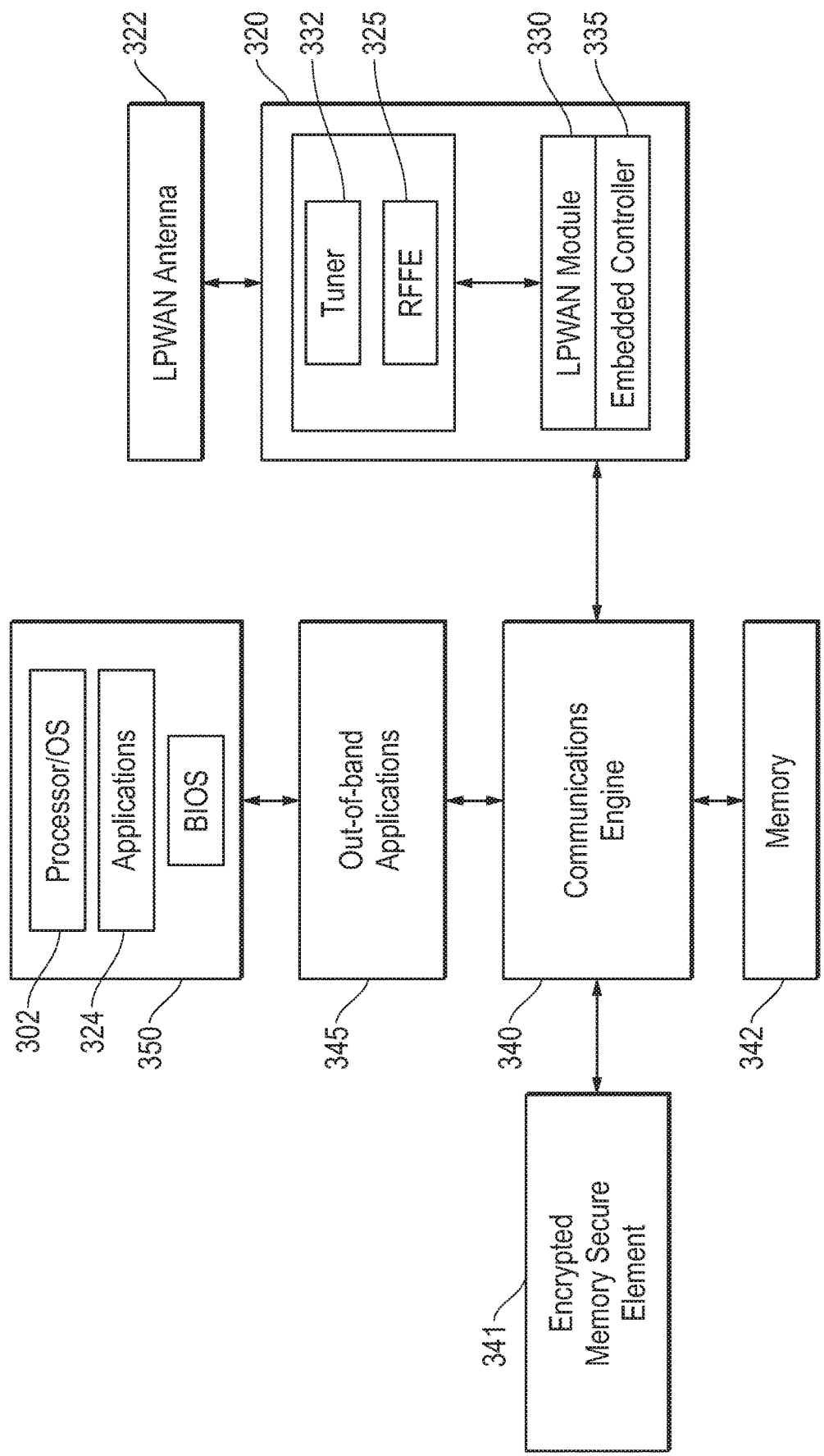
FIG. 3 block diagram illustrating an LPWAN wireless interface adapter with a low power (LP) communications engine for an information handling system according to an embodiment of the present disclosure.

FIG. 3 illustrates a wireless interface adapter 320 including RF front end 325 and tuner 332 for one or more antenna systems, such as an LPWAN antenna 322 and high-speed wireless link antenna 310, that may operate on an information handling system in an example embodiment. The high-speed wireless link antenna 310 may be capable of establishing one or more wireless links conforming to existing WLAN, WPAN, WWAN standards. An example high-speed wireless link may adhere to the IEEE 802.11ad WiGig standard in an embodiment. In another embodiment, the high-speed wireless link may conform to the IEEE 802.16 Wi-MAX standard. The high-speed wireless link in another example embodiment may conform to the ITU-IMT 5G WWAN standard 2020. In yet another embodiment, the high-speed wireless communication link may conform to the LTE-U standard.

The wireless interface adapter 320 in an embodiment may operate in both in-band and out-of-band environments. In an example aspect, the wireless interface adapter 320 may be utilized with an out-of-band operational environment in that it may be implementable in a variety of models of information handling systems to provide for always-on wireless connectivity in a variety of sleep states or performance states. The out-of-band operational environment may include an embedded processor, such as embedded controller 335, that may provide logic for firmware or software instructions that implement a low power communications engine 340 according to embodiments of the present disclosure. In other embodiments, the low power communications engine 340 may be implemented on processing or logic available from elsewhere in a managed information handling system, such as a remote management card in some embodiments. A processor or controller available in an out-of-band environment may operate even during sleep states or lowered performance states under the ACPI or other power saving protocols.

The LPWAN wireless interface adapter 320 may include the RF front end 325, tuners 332, an RF front end controller such as 335 and may include access to a local memory 342 in some embodiments. The embedded controller 335 may also interface with the one or more tuners 332 and execute the LPWAN module 330 for conducting LPWAN communications according to protocols being implemented for the LPWAN communications. For example, LPWAN protocols such as Long Range (LoRa) chirp spread spectrum radio modulation technology, Ultra Narrow Band (UNB) modulation technology, LTE Narrowband IoT (NB-IOT) and LTE Category Machine Type Communications (LTE-MTC) protocol types, DASH7 Mode 2 development framework for low power wireless networks, random phase multiple access (RPMA), and direct sequence spread spectrum (DSSS) may be implemented in some embodiments as understood in the art with the LPWAN module 330. The RF front end module 325 may interface with one or more LPWAN antenna systems 322 directly or via a tuner system 332.

Components of the LPWAN wireless interface adapter 320 may be connected internally and to a plurality of system motherboard components for an information handling system. For example, I2C lines may be connected between the RF front end 325 and an LPWAN module or among other components of the LPWAN wireless interface adapter 320 or to the motherboard 350 or remote management card of an information handling system. The remote management card may operate code instructions of communications engine 340 for in-band (IB) and out-of-band (00B) communications as well as out-of-band applications 345 in various embodiments. The remote management card in some embodiments may further have access to a local memory such as 342 in some embodiments. In further embodiments, the remote management card may also have access to an encrypted secure memory 360 in which encrypted subscriber information may be stored. Such subscriber information may include usernames and/or passwords for subscribers that have been authorized to use the information handling system, billing information for that subscriber, or instructions limiting a given subscriber's access to the information handling system (e.g. to a preset list of applications, and/or over a preset and limited time period). Such subscriber information may be received from the PCaaS cloud management service and/or remote data center in an embodiment.

In a further aspect, a Mobile Industry Processor Interface (MIPI) lines may be connected among components of the LPWAN wireless interface adapter 320 or the motherboard 350 of the information handling system in other embodiments. The MIN connector or I2C may be connected to the LPWAN module 330 to forward instructions, policy details, or other data or commands to the RF front end 325 according to embodiments of the present disclosure. It is understood that the I2C lines or MIPI lines may be used for various aspects of the embodiments disclosed herein including for transfer of data, policy, or commands from the protocol module 330 or other subsystems of the wireless interface device adapter 320. Further, other bus systems as shown in FIG. 1 may be used for communications between the LPWAN interface adapter 320 and portions of the motherboard of the managed information handling system.

Low power communications engine 340 of the present disclosure may include hardware, firmware, or software instructions to determine priority levels received via incoming messages, instructions, and data from low power wireless links according to one or more LPWAN protocols. In an embodiment, the low power communications engine 340 may operate in an out-of-band operational environment to verify log-in credentials for an on-demand service subscription. In some embodiments, the low-power communications engine operates in an out-of-band environment in whole or in part on a processor or controller other than the CPU 302. In an example embodiment, the out-of-band environment may operate on embedded controller 335 or on other processors or controllers such as for a remote management card. In further embodiments, out-of-band environment may reside in some portion of processing on the motherboard 350, such as with an integrated remote management card. The low power communications engine 340 may interface with the BIOS operating with the operating system of the main processor or processors in various embodiments when wake up is needed. Additionally, the LPWAN interface adapter 320 may operate during powered-down sleep states such that an embedded controller 335 may serve as a network interface controller in some aspects and implement Remote Management Control Protocol (RMCP) or similar remote via a separate MAC address from other wireless communications to provide communications, data, instructions or the like received via a remote management card which may be separate or integrated into motherboard 350.

In some embodiments, the remote management card may include a processor or controller (not shown) to execute code instructions in software or firmware in the out-of-band environment. Often the out-of-band environment may include PCaaS applications 345 that may influence operations such as automatic log-in to a remote PCaaS cloud management service as described above. This out-of-band environment may be provided with always-on management or security solutions such as Dell Command/Intel vPro Out-of-band for example. Nonetheless, processing capability of the remote management card, whether integrated or not, may provide for execution of instructions of the low power communications engine 340 in automatically logging into the remote PCaaS cloud management system. This may be done in some embodiments via the processor or controller on the remote management card or in combination with a processor or controller in the wireless interface adapter 320. In some embodiments, the remote management card may include memory 342 which may be used to execute out-of-band applications 345 as well as activity of the low power communications engine 340 such as to store communications or data in some embodiments.

Figure 4:
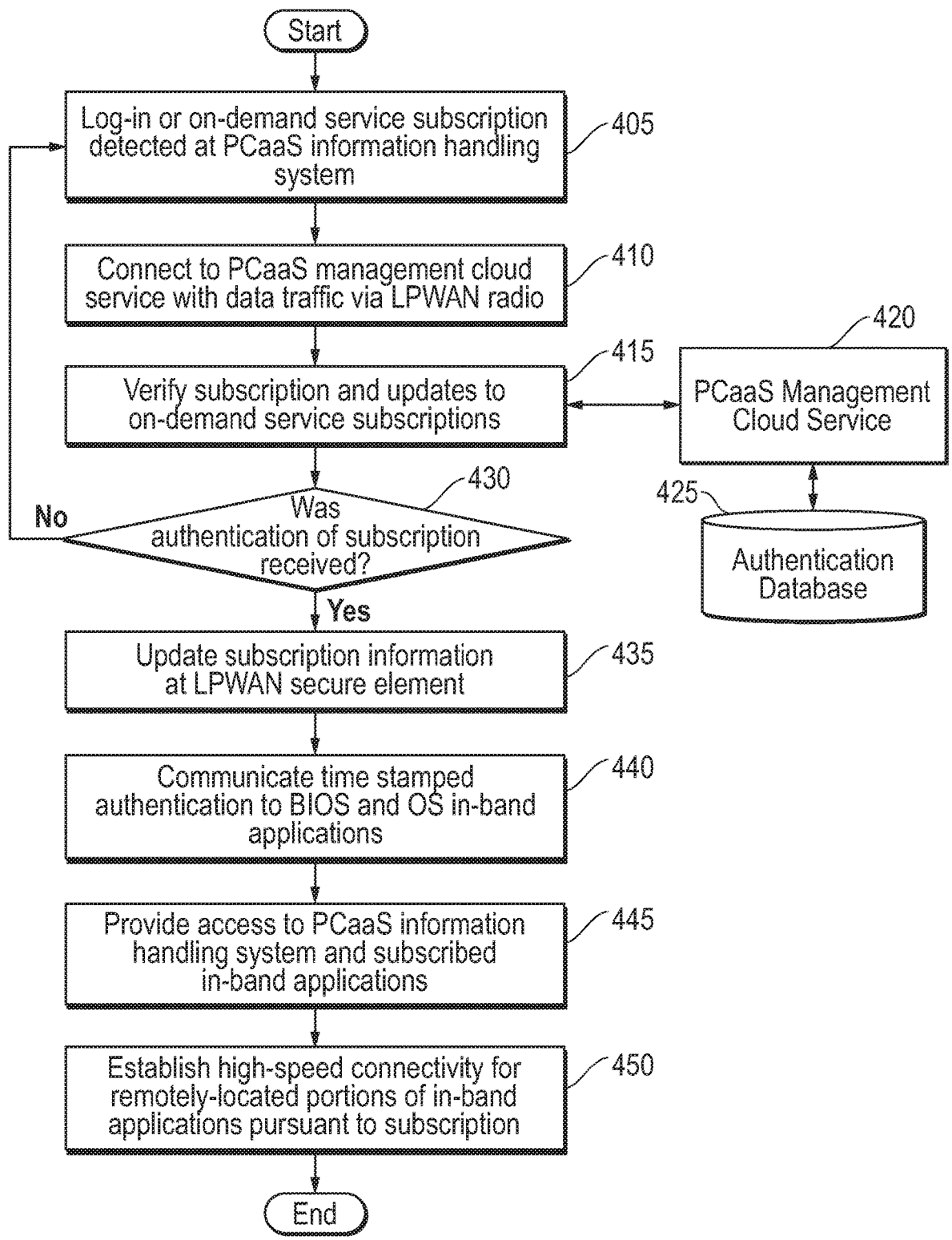
FIG. 4 illustrates a method for granting an on-demand service subscriber access to PCaaS in-band applications according to an embodiment of the present disclosure.

FIG. 4 illustrates a method for granting an on-demand service subscriber access to subscription-based PCaaS in-band applications based on received or detected log-in credentials according to an embodiment of the present disclosure. The method of FIG. 4 may be executed via code instructions for an LP communications engine on one or more processors or controllers such as in the wireless interface adapter or a remote management card in an information handling system. As described, a remote management card may be integrated or separate in the information handling system in some embodiments. The remote management card may include logic for a processor and/or controller as well as memory that may operate despite a sleep state, such as an ACPI sleep state, being implemented on the information handling system. It is understood that each of the following steps may be performed by the LP communications engine at the information handling system entirely at one controller or processor or across several processors or controllers in the out-of-band environment and at the wireless interface adapter. The always-on out-of-band PCaaS management system may also have some portion performed from a remote location in whole or in part while other portions of the remote management may take place at the managed information handling system.

At block 402, the LP communications engine in an embodiment may detect log-in credentials or an on-demand service subscription identification. For example, a subscribing user may input identifying login credentials associated with an established subscription. In another example embodiment described with reference to FIG. 3, the LP communications engine 340 may intercept data packets received by the wireless adapter 320 at the LPWAN antenna 322 indicating a user with login credentials is nearby the information handling system. In this example embodiment, one or more LPWAN wireless links may be always-on and available via LPWAN Antenna 322 for a mobile information handling system to receive wireless transmissions of data packets identifying a nearby user with on-demand subscription login credentials. Such received identifying data packets may be forwarded onto the PCaaS out-of-band application 345 in an embodiment.

The PCaaS out-of-band application in an embodiment may connect to the remote PCaaS cloud management service via one or more LPWAN wireless links at block 404. For example, the communications engine 340 in an embodiment may allow for the transmission of data packets between the PCaaS out-of-band application 345 and the wireless adapter 320. Further, the wireless adapter 320 may execute code instructions of the PCaaS out-of-band application 345 in such an embodiment to establish contact with the remotely located PCaaS cloud management service via LPWAN antenna 322. As another example embodiment described with reference to FIG. 2, the PCaaS out-of-band application operating onboard one of information handling systems 210, 220, or 230 may establish contact with the remotely located PCaaS cloud management service 280 via LPWAN 270.

At block 406, the PCaaS out-of-band application in an embodiment may request verification of the log-in credentials or on-demand service subscription identification from the remote PCaaS cloud management service 280, and/or any current updates to the subscription information. For example, in an embodiment described with reference to FIG. 2, the PCaaS out-of-band application operating onboard one of information handling systems 310, 320, or 330 may simultaneously transmit the login credentials received at block 402 and a request for verification of those credentials to the remote PCaaS cloud management service 280 via LPWAN 270. Such a verification request may further include a request for the PCaaS cloud management service 280 to transmit any information updates to the subscription associated with the login credentials received at block 402, as stored at the remote data center 286. In response to these requests, the PCaaS cloud management service 280 may transmit, via an LPWAN wireless link, a message indicating the login credentials have not been verified, or a verification of the login credentials, and any applicable updated subscription information.

The PCaaS out-of-band application in an embodiment may determine whether the verification of the log-in credentials or on-demand service subscription identification has been received from the remote PCaaS cloud management service at block 408. The PCaaS cloud management service in an embodiment may indicate the login credentials are not verified in if no subscriber is associated with those credentials, or if the subscription associated with those credentials is expired or flagged for security reasons. If the PCaaS out-of-band application does not receive verification of the login credentials received at block 402 in an embodiment, the method may proceed back to block 402 for detection of other login credentials that may be verified. Other possible measures including freezing or tracking the location of the information handling system (e.g. through geo-fencing or other methods) may also be employed in response in some embodiments. If the PCaaS out-of-band application receives verification of the login credentials received at block 402 in an embodiment, the method may proceed to block 410.

At block 410, if verification and updates have been received, the PCaaS out-of-band application in an embodiment may instruct the communications engine to store received updated subscription information at an encrypted secure memory. For example, in an embodiment described with reference to FIG. 3, the PCaaS out-of-band application 345 may instruct the communications engine 340 to store the received updated subscription information at the encrypted secure memory 360. The encrypted secure memory 360 may be part of the wireless interface adapter 320, at the remote management card 140, or may be located with another part of the information handling system in some embodiments. In an example embodiment, the encrypted secure memory 360 may be part of a remote management card integrated in the motherboard 350 or part of a standalone remote management card 140. In one embodiment, the encrypted secure memory 360 may be an addressable memory from which stored messages may be retrieved and forwarded to PCaaS out-of-band application 345. In other embodiments, the encrypted secure memory 360 may be a buffer memory with a first-in, first out structure such that older messages are transferred first from memory. In yet another example embodiment, a last-in, first out structure buffer memory may be used such that newer messages are transferred first from memory which, for example, may be beneficial when newer updates or status messages would be preferable to older versions.

The communications engine may transmit a time stamped authentication to the BIOS and OS in-band applications at block 412 in an embodiment. For example, in an embodiment described with reference to FIG. 3, the communications engine 340 may transmit a time stamped authentication describing the verification of the subscription received at block 408 to the BIOS in the motherboard 350 and the OS 302. The LP communications engine 340 code instructions may be executed in firmware or software at a controller or processor at the remote management card 140, wireless adapter 320, or some combination. The LP communications engine 340 will receive data packets transmitted via LPWAN antenna 322.

At block 414, the wireless adapter in an embodiment may establish one or more high-speed wireless links with the remote PCaaS cloud management service for remotely-located portions of in-band applications associated with the verified subscription. For example, in an embodiment described with reference to FIG. 3, the wireless adapter 320 may execute code instructions of the PCaaS out-of-band application 345 to establish a wireless link with the remote PCaaS cloud management service via the high-speed wireless link antenna 310 in an embodiment. As another example described with reference to FIG. 2, the wireless adapter may execute code instructions of the PCaaS out-of-band application operating onboard one of information handling systems 210, 220, or 230 to establish a wireless link between that information handling system (e.g. 210, 220, or 230) and the PCaaS cloud management service 280 or remote data center 286 via WLAN 255 or WWAN 260. Wireless communications across WLAN 255 or WWAN 260 may be via IEEE 802.11 Wi-Fi, IEEE 802.11ad WiGig, IEEE 802.15 WPAN, IEEE 802.16 Wi-MAX, Telecommunications Union International Mobile Telecommunications (ITU-IMT) 5G wireless wide area network (WWAN) standard 2020, long term evolution unlicensed spectrum (LTE-U) standard, or other emerging 5G small cell WWAN communications such as eNodeB, or similar wireless network protocols. Alternatively, other available wireless links within wireless networks 255 and 260 may include macro-cellular connections via one or more service providers. Service provider macro-cellular connections may include 2G standards such as GSM, 2.5G standards such as GSM EDGE and GPRS, 3G standards such as W-CDMA/UMTS and CDMA 2000, 4G standards including LTE-U, or emerging 5G standards including WiMAX, LTE, and LTE Advanced, LTE-LAA, small cell WWAN, and the like. Wireless networks 255 and 260 may include a variety of licensed, unlicensed or shared communication frequency bands as well as a variety of wireless protocol technologies ranging from those operating in macrocells, small cells, picocells, or femtocells. The data rate or bit rate of the high-speed wireless link established at block 414 in such an embodiment may be considerably higher than the data rate of the wireless link established via LPWAN antenna in an embodiment.

The OS in an embodiment may provide user access to in-band applications associated with the verified subscription at block 416. For example, in an embodiment described with reference to FIG. 2, the operating system of one of information handling systems 210, 220, or 230 may receive data packets including code instructions of in-band applications located at the PCaaS cloud management service 280 or the remote data center 286 via network 255 or 260. By executing those code instructions at information handling system 210, 220, or 230 in an embodiment, the user of the information handling system may interact with those in-band applications as if they were stored and executed entirely within information handling system 210, 220, or 230. In such a way, the PCaaS on-demand subscription service may allow a user of any information handling system receiving authentic credentials to access in-band applications of the subscription service. The method may then end.

Figure 5:
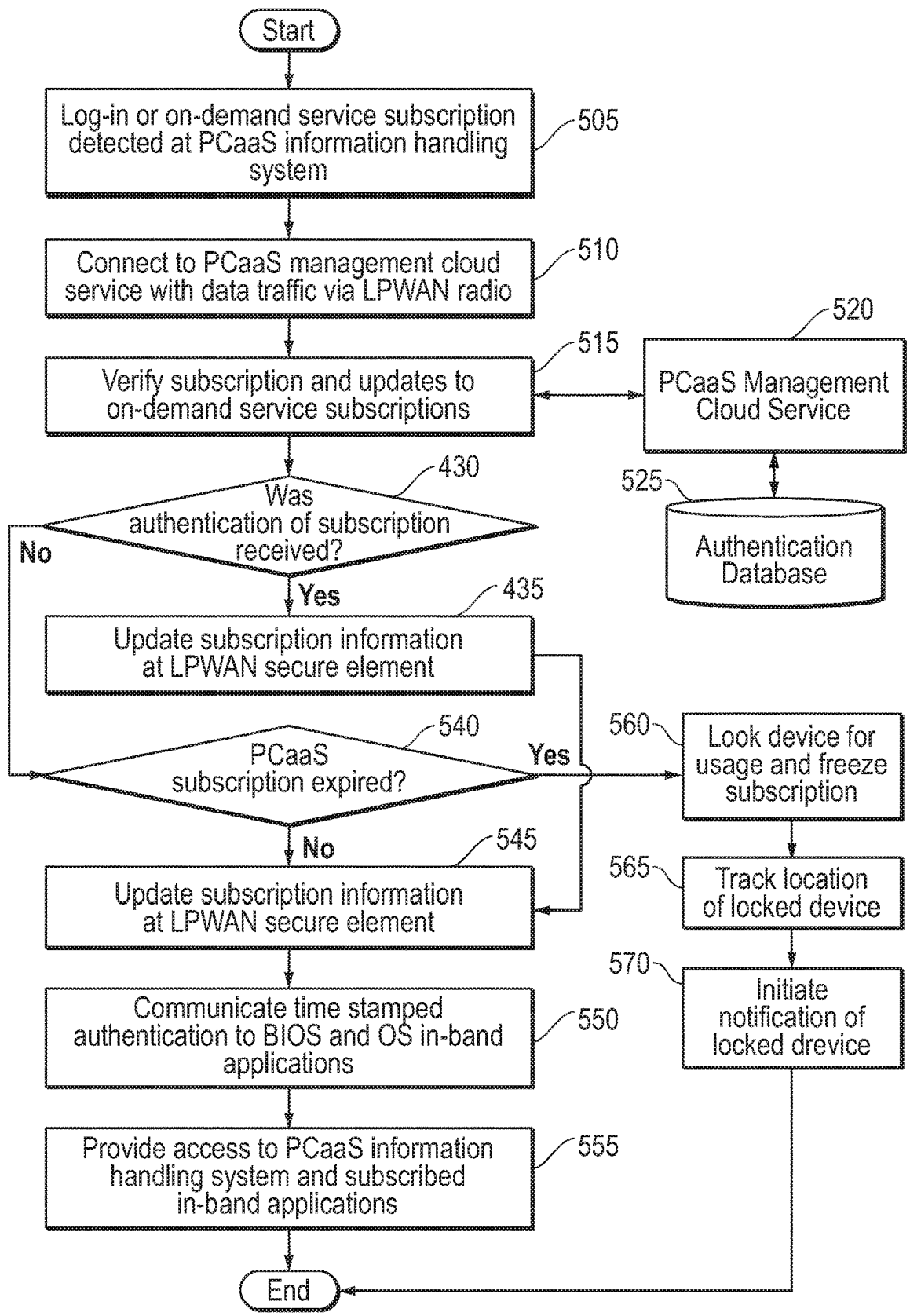
FIG. 5 illustrates another method for verifying subscription login credentials according to an embodiment of the present disclosure.

FIG. 5 illustrates another method for verifying subscription login credentials and for securing information handling systems in receipt of invalid credentials according to an embodiment of the present disclosure. As described herein, upon receiving login credentials from a subscriber of an on-demand PCaaS cloud management service, an information handling system may transmit a request for verification of such login credentials to the PCaaS cloud management service.

At block 502, the PCaaS cloud management service in an embodiment may receive a request for subscription verification and updates. For example, in an embodiment described with reference to FIG. 2, the PCaaS cloud management service 280 may receive a request for verification of login credentials for a user from one of information handling systems 210, 220, or 230. Such a verification request may be received via LPWAN 270 in an example embodiment. The verification request may further include a request for the PCaaS cloud management service 280 to transmit any information updates to the subscription associated with the login credentials, as stored at the remote data center 286. For example, if a subscription has been pre-purchased to allow for access to in-band applications for a preset time period, updated information for that subscription may include an indication of the time remaining on the subscription. As another example, updated information may update a list of in-band applications (e.g. add or remove items) to which the subscriber has access pursuant to the subscription.

The PCaaS cloud management service in an embodiment may determine whether the login credentials received at block 504 are associated with a new user of the PCaaS cloud management service. For example, in an embodiment described with reference to FIG. 2, the PCaaS cloud management service may access a remote data center 286 where subscription information may be stored. Subscription information stored at the remote data center 286 may, for example, associate a user subscription with login credentials, and status of the subscription (e.g. current, expired, new). In other embodiments, the subscription information may further include a log of each time the subscriber has logged into the PCaaS cloud management system via a remote information handling system. If the log does not yet contain any such entries in an example embodiment, the PCaaS cloud management system may identify the subscriber associated with the received login information as a new user of the PCaaS cloud management system. For example, if the PCaaS cloud management system 280 receives the verification request from information handling system 220, and the log indicates the subscriber has previously accessed the system 280 via information handling system 220, the system 280 may not identify the subscriber as a new user. As another example, if the PCaaS cloud management system 280 receives the verification request from information handling system 210, and the log indicates the subscriber has not previously accessed the system 280 via information handling system 210, the system 280 may identify the subscriber as a new user.

In another embodiment, the subscription information may further include a log listing an identification of each information handling system from which the subscriber associated with the received login credentials has accessed the PCaaS cloud management system. In such an embodiment, if the log indicates the subscriber has accessed the PCaaS cloud management system from information handling systems other than the one from which the request for subscription verification was received at block 502, but does not list any access attempts from the information handling system from which the request for subscription verification was received, the PCaaS cloud management system may identify the subscriber associated with the login credentials as a new user. For example, if the PCaaS cloud management system 280 receives the verification request from information handling system 210, the log indicates the subscriber has not previously accessed the system 280 via information handling system 210, but indicates the subscriber has previously accessed the system 280 via information handling system 220, the system 280 may identify the subscriber as a new user. If the login credentials are associated with a new user, the method may proceed to block 506. If the login credentials are associated with a subscriber that is not a new user, the method may proceed to block 510.

At block 506, if the login credentials are associated with a new user, the PCaaS cloud management service may transmit an instruction to the requesting information handling system to execute a system wipe of any previous user's subscription data. For example, if the requesting information handling system is information handling system 210 in an embodiment, the PCaaS cloud management service 280 may transmit an instruction to information handling system 210 to delete all subscription data stored at information handling system 210. In an embodiment described with reference to FIG. 3, the requesting information handling system may respond to such an instruction received from the PCaaS cloud management system by deleting all subscription data stored in encrypted secure memory 360.

The PCaaS cloud management service may transmit a verification of the login credentials at block 508 in an embodiment. For example, the PCaaS cloud management service 280 described in an embodiment with reference to FIG. 2 may transmit a verification of the login credentials received from information handling system 210 at block 502 via LPWAN 270. Such a verification message may further include an identification of the subscriber associated with the login credentials in some embodiments. The method of verifying the login credentials may then end and the information handling system in receipt of the verification may complete the method of FIG. 4 to provide access and updates.

At block 510, the PCaaS cloud management service in an embodiment in which the login credentials are associated with a subscriber that is not a new user may determine whether the subscription associated with the login credentials has expired. For example, in an embodiment described with reference to FIG. 2, the PCaaS cloud management service may access a remote data center 286 which stores subscription information associating a user subscription with login credentials, and includes a status of the subscription (e.g. current, expired, new). A subscription may be listed as expired if the time period for which a user paid has elapsed, if a previous payment attempt has failed, or if a security hold has been placed on the user account. If the subscription associated with the login credentials has not expired, the method may proceed to block 512. If the subscription associated with the login credentials has expired, the method may proceed to block 514.

The PCaaS cloud management service in an embodiment may transmit a verification of the login credentials and any updates associated with the subscription at block 512 if the subscription associated with the login credentials has not expired. For example, in an embodiment described with reference to FIG. 2, the PCaaS cloud management service 280 may fetch updated subscription data for the establish subscription stored at the remote data center 286 and transmit such data to the requesting information handling system (e.g. 220) via LPWAN 270. Such updated subscription information may include an indication of the time remaining on the subscription, or an updated list of in-band applications to which the subscriber has access pursuant to the subscription. In such a way, the PCaaS cloud management system 280 in an embodiment may manage the information handling system's ability to access the in-band applications residing at the PCaaS cloud management system 280 or the remote data center 286. The method may then end.

If the subscription associated with the login credentials has expired, the PCaaS cloud management service in an embodiment may freeze the subscription and transmit an instruction to lock the requesting information handling system at block 514. For example, if the subscription associated with the login credentials received at block 502 from information handling system 210 has expired for lack of payment, depletion of previously paid resources, or security threat, the PCaaS cloud management system 280 in an embodiment may transmit an instruction to information handling system 210 via LPWAN 270 to deny the user access to any in-band applications residing at the PCaaS cloud management system 280 or the remote data center 286. In another embodiment, such an instruction may include code instructions to disallow the user access to any portion of the operating system of information handling system 220. The PCaaS cloud management service in another embodiment may similarly perform the operation of block 514 if the login credentials received at block 502 do not match any known subscriber (e.g. new, current, or expired subscriber).

At block 516, the PCaaS cloud management service in an embodiment may transmit a request to track the location of the locked requesting information handling system. If a subscription has expired, this may indicate the user attempting to access the PCaaS cloud management system via the information handling system has stolen the information handling system. In such a scenario, the PcaaS cloud management system may ascertain geographical location data for the information handling system in order to allow the authorities to locate the stolen device. For example, the PCaaS cloud management system 280 in an embodiment may transmit a request for information handling system 220 to send intermittently updated information about the geographical location of the system 220. In an example embodiment described with reference to FIG. 1, the information handling system may include a GPS unit 114 which may be capable of measuring the geographical location of the information handling system at preset intervals. The information handling system may then transmit such intermittent measurements back to the PCaaS cloud management system via a LPWAN. In other embodiments, a geofencing method may be employed in which the PCaaS cloud management system automatically shuts down or restricts access to the information handling system if its location moves outside a virtual, preset geographic boundary.

The PCaaS cloud management service in an embodiment may transmit an instruction to display a notification for the user of the requesting information handling system that the device has been locked at block 518. For example, in an embodiment described with reference to FIG. 2, the PCaaS cloud management service 280 may transmit an instruction to information handling system 220 to display a message to the user indicating the device (information handling system 220) has been locked. The method may then end.

It is understood that the methods and concepts described in the algorithms above for FIGS. 4 and 5 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of FIGS. 4 and 5 may be modified as understood by those of skill to implement variations described therein from either figure embodiment.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a controller to execute out-of-band code instructions for a low power communications engine to receive log-in credentials for an on-demand service subscription via a first wireless link that is a low-power wide area network (LPWAN) from a second, remote personal computer as a service (PCaaS) linked information handling system, where the on-demand service subscription is to access one or more in-band applications;
the controller to execute the out-of-band code instructions for the low power communications engine to determine verification of the log-in credentials for the on-demand service subscription is permitted as received from a remote PCaaS cloud management service and stored in an encrypted secure memory;
the wireless adapter, based on code instructions received from the controller, to establish a second wireless link that is a high-speed wireless communication link and providing communications for the one or more in-band applications associated with the verified on-demand service subscription via the second wireless link to the remote PCaaS linked information handling system;

the controller to execute code instructions to transmit a time-stamped authentication message to a BIOS and operating system for the one or more in-band applications of the remote PCaaS linked information handling system; and a processor to execute the code instructions of the one or more in-band applications via an agent on the information handling system.

2. The information handling system of claim 1 further comprising:

a remote management card having encrypted secure memory detecting log-in credentials identifying the on-demand service subscription for authentication via stored login credentials and subscription status.

3. The information handling system of claim 1 further comprising:

the controller to execute code instructions to receive an update to the on-demand service subscription; and the controller to transmit code instructions to store the update at an encrypted secure memory of the information handling system.

4. The information handling system of claim 1, wherein the LPWAN is a low-range (LoRa) network.

5. The information handling system of claim 1 further comprising:

the wireless adapter transmitting code instructions to disallow the subscriber access to the remote PCaaS linked information handling system, if the subscription has expired.

6. The information handling system of claim 1, wherein a user of the remote information handling system is a new user of the PCaaS cloud management service, further comprising:

the controller to execute code instructions received from the PCaaS cloud management service to delete login credentials and subscription data stored in an encrypted secure memory associated with a previous user of the remote PCaaS linked information handling system.

7. The information handling system of claim 1, wherein the high-speed wireless communication link conforms to the WLAN IEEE 802.11 n standard or later issued IEEE 802.11 standard.

8. A method of managing access to on-demand cloud services comprising:

receiving at a personal computer as a service (PCaaS) cloud management service information handling system wireless adapter log-in credentials from a second remote PCaaS linked information handling system, via first wireless link that is a low-power wide area network (LPWAN) communication link;

executing code instructions of the PCaaS cloud management system, via a processor, to determine if the log-in credentials are associated with an existing subscriber to one or more in-band applications in a memory;

if the log-in credentials are associated in the memory with an existing subscriber whose subscription is not expired, transmitting, via a wireless adapter, a verification of the log-in credentials to the second remote PCaaS linked information handling system;

establishing, via the wireless adapter, a high-speed wireless communication link with the second remote PCaaS information handling system;

receiving an update to the on-demand service subscription and transmitting code instructions to store the update at an encrypted secure memory of the information handling system; and transmitting or receiving code instructions to or from the second remote PCaaS linked information handling system, via the wireless adapter, of the one or more in-band applications associated with a verified, existing subscriber, via the high-speed wireless communication link.

9. The method of claim 8 further comprising:

transmitting code instructions, via the wireless adapter, to the second remote PCaaS linked information handling system to delete data associated with a previous subscriber stored at a memory of the second remote PCaaS linked information handling system, if the subscriber is a new subscriber; and transmitting or receiving code instructions to or from the second remote PCaaS linked information handling system, via the wireless adapter, of one or more in-band applications associated with the new subscriber, via the high-speed wireless communication link.

10. The method of claim 8 further comprising:

transmitting code instructions, via the wireless adapter, to disallow the subscriber access to the second remote PCaaS linked information handling system, if the subscription has expired; and transmitting code instructions, via the wireless adapter, for the second remote PCaaS linked information handling system to display a notification that the second remote PCaaS linked information handling system has been locked.

11. The method of claim 10 further comprising:

receiving a geographical location of the remote PCaaS linked information handling system, via the wireless adapter; and storing the geographical location in the memory.

12. The method of claim 10 further comprising:

receiving a geographical location of the remote PCaaS linked information handling system, via the wireless adapter; and locking user access to the remote PCaaS linked information handling system if the geographical location of the remote PCaaS linked information handling system does not fall within a preset geographical area.

13. The method of claim 8 further comprising:

transmitting an update to the subscription to the remote PCaaS linked information handling system, via the wireless adapter.

14. The method of claim 8, wherein the high-speed wireless communication link is a Wi-MAX link conforming to the IEEE 802.16 standard or later issued IEEE 802.16 standard.

15. A personal computer as a service (PCaaS) linked information handling system comprising:

a controller to execute out-of-band code instructions for a low power communications engine to receive login credentials for a new on-demand service subscription via a low-power wide area network (LPWAN);

a wireless adapter to establish a first wireless communication link, via the LPWAN, with a remote personal computer as a service (PCaaS) cloud management service at a remote PCaaS server system;

the wireless adapter to transmit a request to verify the login credentials to the PCaaS cloud management service via the first wireless communication link that is the LPWAN;

a controller to execute out-of-band code instructions for a low power communications engine to receive verification of the detected log-in credentials, via the first wireless communication link, from the remote PCaaS cloud management service of the remote PCaaS server system;

the controller to execute code instructions received from the remote PCaaS cloud management service to store subscription data associated with the new on-demand service subscription for one or more in-band applications at an encrypted secure memory;

the controller to execute code instructions received from the remote PCaaS cloud management service on the remote PCaaS server system to delete data stored at an encrypted secure memory operably connected to the controller associated with a previous subscriber;

the wireless adapter, based on instructions received from the controller, to establish a second high-speed wireless communication link with the remote PCaaS cloud management service and the remote PCaaS server system;

the wireless adapter to receive code instructions of the one or more in-band applications run from the PCaaS cloud management service at the remote PCaaS server system associated with the verified, new on-demand service subscription via the second high-speed wireless communication link; and a processor to execute the code instructions of the one or more in-band applications via an agent on the PCaaS linked information handling system.

16. The information handling system of claim 15 further comprising:

the wireless adapter to receive a geographical location of the remote PCaaS linked information handling system; and the controller to send code instructions to lock user access to the remote PCaaS linked information handling system if the geographical location of the remote PCaaS linked information handling system does not fall within a preset geographical area.

17. The information handling system of claim 15 further comprising:

a remote management card to detect log-in credentials identifying the new on-demand service subscription.

18. The information handling system of claim 15 further comprising:

the controller to execute code instructions to transmit a time-stamped authentication message to the BIOS and operating system in-band applications of the PCaaS linked information handling system.

19. The information handling system of claim 15, wherein the high-speed wireless communication link conforms to a 5G wireless wide area network (WWAN) standard set by International Telecommunications Union International Mobile Telecommunications (ITU-IMT) standard 2020.

20. The information handling system of claim 15, wherein the high-speed wireless communication link conforms to a long term evolution unlicensed spectrum (LTE-U) standard.

* * * * *